(12) United States Patent
Guntoro et al.

(10) Patent No.: US 11,593,232 B2
(45) Date of Patent: Feb. 28, 2023

(54) METHOD AND DEVICE FOR VERIFYING A NEURON FUNCTION IN A NEURAL NETWORK

(71) Applicant: Robert Bosch GmbH, Stuttgart (DE)

(72) Inventors: Andre Guntoro, Weil der Stadt (DE); Armin Runge, Wuerzburg (DE); Christoph Schorn, Leonberg (DE); Sebastian Vogel, Schaidt (DE); Jaroslaw Topp, Renningen (DE); Juergen Schirmer, Heidelberg (DE)

(73) Assignee: Robert Bosch GmbH, Stuttgart (DE)

( * ) Notice: Subject to any disclaimer, the term of this patent is extended or adjusted under 35 U.S.C. 154(b) by 1092 days.

(21) Appl. No.: 16/240,003

(22) Filed: Jan. 4, 2019

(65) Prior Publication Data

US 2019/0251005 A1  Aug. 15, 2019

(30) Foreign Application Priority Data

Feb. 12, 2018  (DE) .......................... 102018202095.7

(51) Int. Cl.
| | | |
|---|---|---|
| *G06F 11/14* | (2006.01) | |
| *G06F 17/16* | (2006.01) | |
| *G06N 20/10* | (2019.01) | |
| *G06N 3/10* | (2006.01) | |
| *G06F 17/15* | (2006.01) | |

(52) U.S. Cl.
CPC .......... *G06F 11/1476* (2013.01); *G06F 17/15* (2013.01); *G06F 17/16* (2013.01); *G06N 3/10* (2013.01); *G06N 20/10* (2019.01)

(58) Field of Classification Search
CPC ...... G06F 11/1476; G06F 17/15; G06F 17/16; G06N 3/10; G06N 20/10
See application file for complete search history.

(56) References Cited

PUBLICATIONS

Torres-Huitzil, Cesar, and Bernard Girau. "Fault tolerance in neural networks: Neural design and hardware implementation." 2017 International Conference on ReConFigurable Computing and FPGAs (ReConFig). IEEE, 2017. (Year: 2017).*
Bettola, Simone, and Vincenzo Piuri. "High performance fault-tolerant digital neural networks." IEEE transactions on computers 47.3 (1998): 357-363. (Year: 1998).*
Chu, L-C., and Benjamin W. Wah. "Fault tolerant neural networks with hybrid redundancy." 1990 IJCNN international joint conference on neural networks. IEEE, 1990. (Year: 1990).*

* cited by examiner

*Primary Examiner* — Benjamin P Geib
(74) *Attorney, Agent, or Firm* — Norton Rose Fulbright US LLP; Gerard Messina

(57) ABSTRACT

A method for verifying a calculation of a neuron value of multiple neurons of a neural network, including: carrying out or triggering a calculation of neuron functions of the multiple neurons, in each case to obtain a neuron value, the neuron functions being determined by individual weightings for each neuron input; calculating a first comparison value as the sum of the neuron values of the multiple neurons; carrying out or triggering a control calculation with one or multiple control neuron functions and with all neuron inputs of the multiple neurons, to obtain a second comparison value as a function of the neuron inputs of the multiple neurons and of the sum of the weightings of the multiple neurons assigned to the respective neuron input; and recognizing an error as a function of the first comparison value and of the second comparison value.

13 Claims, 4 Drawing Sheets

METHOD AND DEVICE FOR VERIFYING A NEURON FUNCTION IN A NEURAL NETWORK

RELATED APPLICATION INFORMATION

The present application claims priority to and the benefit of German patent application no. 10 2018 202 095.7, which was filed in Germany on Feb. 12, 2018, the disclosure which is incorporated herein by reference.

FIELD OF THE INVENTION

The present invention relates to neural networks and, in particular, to measures for verifying functions of neurons in neural networks.

BACKGROUND INFORMATION

Machine learning methods are increasingly used in order to master complex tasks in various fields. Adaptive systems are particularly suited for tasks such as, for example, classification of images, object recognition, language processing and others. With the possibility of providing highly parallel processing units on a single module, it is possible to implement deep neural networks with a high degree of parallelism.

Hardware errors, which affect one or multiple individual neurons, become more likely, in particular, in a highly integrated implementation of deep neural networks. There is, in principle, a need therefore to recognize functional errors.

A form of redundancy is needed for error recognition and, if necessary, error correction. The manner in which redundancy is utilized in order to recognize and, if necessary, to correct errors is generally problem-specific. Frequently, a combination of various forms of redundancy is also applied at multiple levels of the overall system. The redundancies may, in principle, include spatial redundancy (proliferation of structures), chronological redundancy (time-delayed verification) and coding (redundancy in the form of multiple pieces of information having the same content).

The conventional approaches for providing redundancy may also be used in the area of deep neural networks. This includes, for example, the replication of parts of the neural network and the like. It may be noted, however, that many of the known approaches for deep neural networks are usable only to an unsatisfactory extent. The conventional approaches for providing redundancy for deep neural networks, in particular, interfere in the architecture of the deep neural networks or change their training methods or require a dedicated hardware or a modification of the hardware, which is not provided in the standard modules.

SUMMARY OF THE INVENTION

According to the present invention, a method for verifying a function of a neural network according to the description herein, as well as a neural network according to the other descriptions herein.

Additional embodiments are specified in the further descriptions herein.

According to a first aspect, a method is provided for verifying a calculation of a neuron value of multiple neurons of a neural network, including the following steps:

carrying out or triggering the calculation of neuron functions of the multiple neurons, in order in each case to obtain a neuron value, the neuron functions being determined by individual weighting parameters for each neuron input;

calculating a first comparison value as the sum of the neuron values of the multiple neurons;

carrying out or triggering a control calculation with one or multiple control neuron functions and with all neuron inputs of the multiple neurons, in order to obtain a second comparison value as a function of the neuron inputs of the multiple neurons and of the sum of the weightings of the multiple neurons assigned to the respective neuron input;

recognizing an error as a function of the first and of the second comparison value.

It may be provided that the neuron functions are each determined as a function of a bias value, the neuron values of the multiple neurons being calculated with the aid of the neuron functions as a function of the bias values, the control calculation of the second comparison value being carried out with the one or with the multiple control neuron functions as a function of a sum of all bias values of the multiple neuron functions.

One idea of the above method is to provide calculations in a neural network by separately designed control neurons, in order to verify the neuron functions of a plurality of functional neurons. In this case, a conventional neuron function is assumed, in which a sum is formed from a multitude of weighted inputs and is biased by a neuron-specific bias value in order to generate a neuron value. This neuron value is generally fed to an activation function in a neural network, which generates the neuron output.

The weighting values and the bias values are available from each neuron and may be further processed accordingly. A verification then takes place by forming the sum of multiple neuron values and providing it as a first comparison value. This first comparison value is compared with a second comparison value, which is ascertained via a control calculation. The control calculation includes a previous calculation of a sum of neuron inputs with identical weightings assigned to the respective neuron inputs and/or of a sum of the weightings of the neuron inputs assigned to the multiple neurons, as well as a subsequent summation in order to obtain the second comparison value.

The option of the implemented neuron functions for efficiently using multiplier functions and addition functions results in the option of applying the associative law of mathematics. Thus, the result of a calculation of the sum of neuron values of multiple neurons may be verified by a separate control calculation. The control calculation may equally include a sequence of multiplications and additions, but which are intended to arrive at the above result in a different way, assuming a proper function of the neurons involved. Thus, a verification of the neuron functions of the neurons is possible.

In essence, the verification of the neuron functions provides for verifying the sum of neuron values as a first comparison value with a sum of products of each of the neuron inputs with the sum of all weightings (all weighting values assigned to this neuron input) as the second comparison value. This control calculation may be carried out in a control neuron and results in proper functions of the relevant neurons in identical first and second comparison values.

Furthermore, the one or the multiple control neuron functions may be carried out by one or by multiple additionally provided control neurons.

The multiple neurons may furthermore be parts of multiple kernels for the calculation of a convolutional neuron network, the control calculation being carried out based on one control kernel, the weightings of the neuron functions of the control kernel being determined by a sum of the weightings of the multiple kernels assigned to a neuron input.

According to one specific embodiment, the sum of all correlating data points within a multidimensional data matrix across all channels may be formed as a first comparison value, the second comparison value being ascertained by applying the control calculation with the control kernel for a matrix position of the respectively correlating data points.

According to one specific embodiment, the multiple neurons may be parts of a kernel for calculating a convolutional neural network based on a multidimensional data matrix, the control calculation being carried out based on a number of sums of data values of the data matrix in a verification dimension, the second comparison value being determined as the sum of the products of the weightings of the kernel, in each case with one of the sums of the data values.

According to another aspect, a device is provided for verifying a calculation of a neural network of multiple neurons of a neural network, the device being designed to:
- carry out or trigger the calculation of neuron functions of the multiple neurons, in order in each case to obtain a neuron value, the neuron functions being determined by individual weightings for each neuron input;
- calculate a first comparison value as the sum of the neuron values of the multiple neurons;
- carry out or trigger a control calculation with one or multiple control neuron functions and with all neuron inputs of the multiple neurons, in order to obtain a second comparison value as a function of the neuron inputs of the multiple neurons and of the sum of the weightings of the multiple neurons assigned to the neuron input; and
- recognize an error as a function of the first comparison value and of the second comparison value.

According to another aspect, a verification system is provided for verifying a calculation of a neuron value of multiple neurons of a neural network, including:
- the multiple neurons, which are designed to carry out the calculation of neuron functions of the multiple neurons, in order in each case to obtain a neuron value, the neuron functions being determined by individual weightings for each neuron input;
- a summing element for calculating a first comparison value as the sum of the neuron values of the multiple neurons;
- at least one control neuron, which is designed to carry out a control calculation with one or multiple control neuron functions and with all neuron inputs of the multiple neurons, in order to obtain a second comparison value as a function of the neuron inputs of the multiple neurons and of the sum of the weightings of the multiple neurons assigned to the respective neuron input; and
- a comparison block, which is designed to recognize an error as a function of the first comparison value and of the second comparison value.

Specific embodiments of the present invention are explained in greater detail below with reference to the appended drawings.

DETAILED DESCRIPTION

Figure 1:
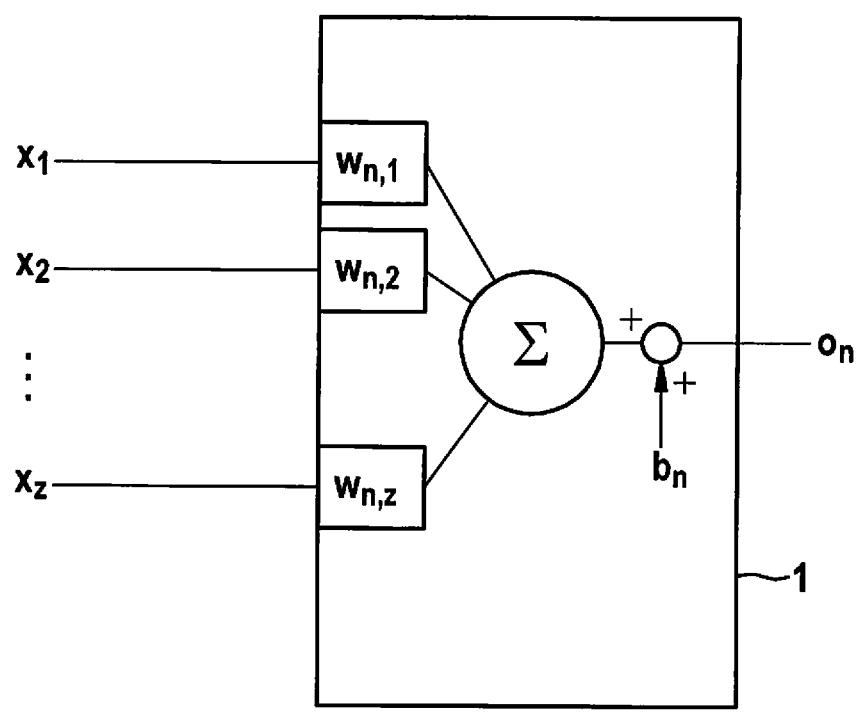
FIG. 1 schematically shows a representation of a neuron.

The core process of neural networks is the neural function. A neuron 1 for constructing a neural network is schematically depicted in FIG. 1. Neuron 1 carries out the neuron function, which includes an addition of a sum of input values $x_i$ weighted with weightings $w_{n,i}$ with a bias value $b_n$, in order to generate a neuron value:

$$o_n = \sum_{i=1}^{z} x_i w_{n,i} + b_n$$

z corresponds to the number of neuron inputs. The provision of the bias value $b_n$ may, if necessary, be optional. The weightings $w_{n,i}$ and the bias values $b_n$ represent the parameters of the neuron function.

The neuron value is, if necessary, provided with an activation function in order to obtain a neuron output. The activation function is handled separately in hardware implementations and is not further considered here.

Thus, each neuron 1 is defined by a number of weighting values $w_{n,i}$ assigned to neuron 1 and to the respective neuron inputs and by an assigned bias value $b_n$. Neurons having such a neuron function are generally implemented by a plurality of multiply-accumulate elements (MAC) in an integrated manner.

To verify the functional capability of neurons, specific embodiments are described below, which utilize the associative law of mathematics, according to which the sum of the neuron values of the neurons in question equals the sum of the products of each neuron input with the sum of the weightings assigned to the neurons plus the sum of the bias values. The following applies:

$$\sum_{n=1}^{m}\left(\sum_{i=1}^{z} x_i w_{n,i} + b_n\right) = \sum_{i=1}^{z}\left(x_i \sum_{n=1}^{m} w_{n,i}\right) + \sum_{n=1}^{m} b_n$$

where m>1 of the number of the neurons to be verified. The right portion of the equation may be implemented by a control neuron 2.

Figure 2:
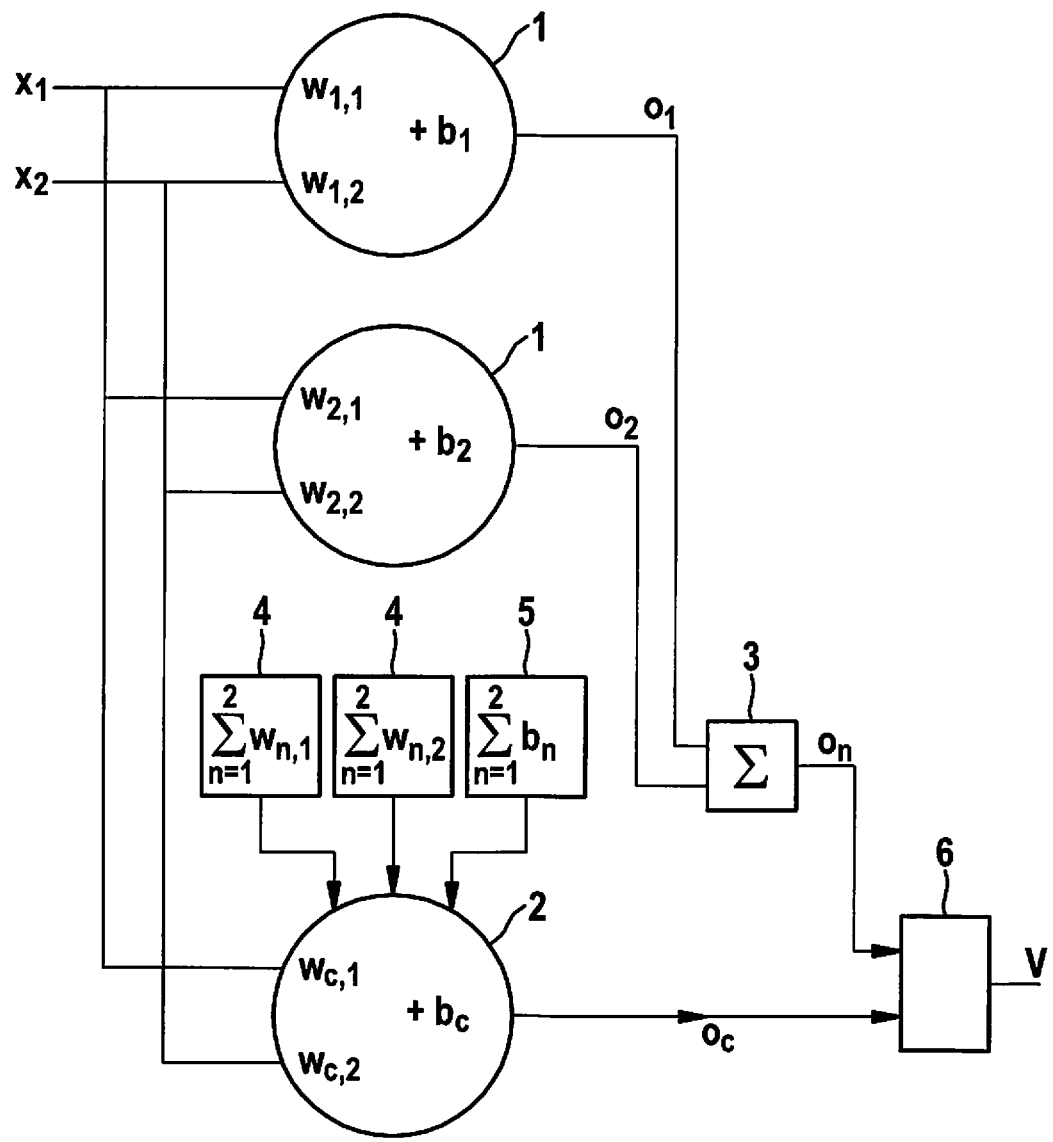
FIG. 2 schematically shows a representation of a functional diagram for illustrating the functionality of a control neuron.

In FIG. 2, a functional diagram for implementing such a control neuron 2 for two neurons 1 to be verified is schematically depicted. Here, two neuron inputs $x_1$, $x_2$ are each added to neurons 1 to be verified, multiplied there in each case with an assigned weighting $W_{1,1}$, $W_{1,2}$, $W_{2,1}$, $W_{2,2}$ and additively provided with a bias value $b_1$, $b_2$. Each neuron output $o_1$, $o_2$ is added to a summing element 3 in order to obtain a first comparison value $o_n$.

The sums of the weightings $$\sum_{n=1}^{2} w_{n,1}, \sum_{n=1}^{2} w_{n,2},$$

assigned to a respective neuron input, with which the respective neuron input $x_1$, $x_2$ is provided, are calculated in second summing elements 4 and added to control neuron as control neuron 2 weightings $w_{c,1}$, $W_{c,2}$. Alternatively, the sum of the weightings may be calculated in advance, since the weightings are fixed after the training, and correspondingly provided from a suitable memory.

In addition, the sums of the bias values $b_1$, $b_2$ assigned to a respective neuron input, with which the respective neuron input $x_1$, $x_2$ is provided, are calculated in a third summing element 5 and added to control neuron 2 as control neuron bias value $b_c$. Alternatively, the sum of the weightings may be calculated in advance, since the bias values $b_1$, $b_2$ are fixed after the training, and correspondingly provided from a suitable memory.

In control neuron 2, the sum of the products is calculated from the control weightings $w_{c,1}$, $w_{c,2}$ with the respectively assigned neuron inputs and additively provided with a control neuron bias value $b_c$ in order to obtain a second comparison value $o_c$.

In a comparison block 6, first comparison value $o_n$ and second comparison value $o_c$ are added in order to obtain a comparison result V. No error is determined in the case of identical comparison values and an error is determined in the case of unequal comparison results V. In this way, it is possible to find errors in the calculation of a neuron value, the cause of the error potentially existing in the calculation hardware of a neuron or in the memories for the storing of the neuron parameters, such as weightings and bias value. In this way, a control neuron 2 may be used in order to recognize an error in one of the calculations of neurons 1.

Another use of the above described control method is in the case of convolutional (folding) neural networks (CNN). These are frequently used for image processing. In general, any type of tensors and matrices having data points may be processed. For ease of understanding, the individual data points are referred to as pixels of a pixel matrix and the values of the data points are referred to as pixel values.

To process a pixel matrix PM, which may correspond to the original data matrix or to a feature map generated from the data matrix, the feature map is scanned by a so-called kernel with the dimension D×D (frequently 3×3, 5×5 or 7×7), and corresponding pixel values processed by the kernel are written into a feature map MK formed therefrom. This means, each kernel forms a resultant pixel value of feature map MK from D×D pixel values of the pixel matrix.

A kernel/filter is part of a CNN. For each calculation step $D_2$, input values, which are multiplied by an assigned weighting, respectively and subsequently added, are added to a D×D kernel. A bias value assigned to the kernel is also added.

A layer of a neural network is calculated by the repeated use of the kernel, in each case on one portion of the input data. The kernel is applied multiple times for this purpose along the x-dimension and y-dimension across pixel matrix PM. Compared to a conventional neural network, the multiple application of the kernel thus corresponds to a large quantity set of neurons, which are consistently applied with the same parameters.

The pixel matrix is scanned at multiple positions set in x-dimension and y-dimension. By pre-assuming edge pixels, so-called paddings, the dimension of feature map MK may correspond to the dimension of original pixel matrix PM.

Figure 3:
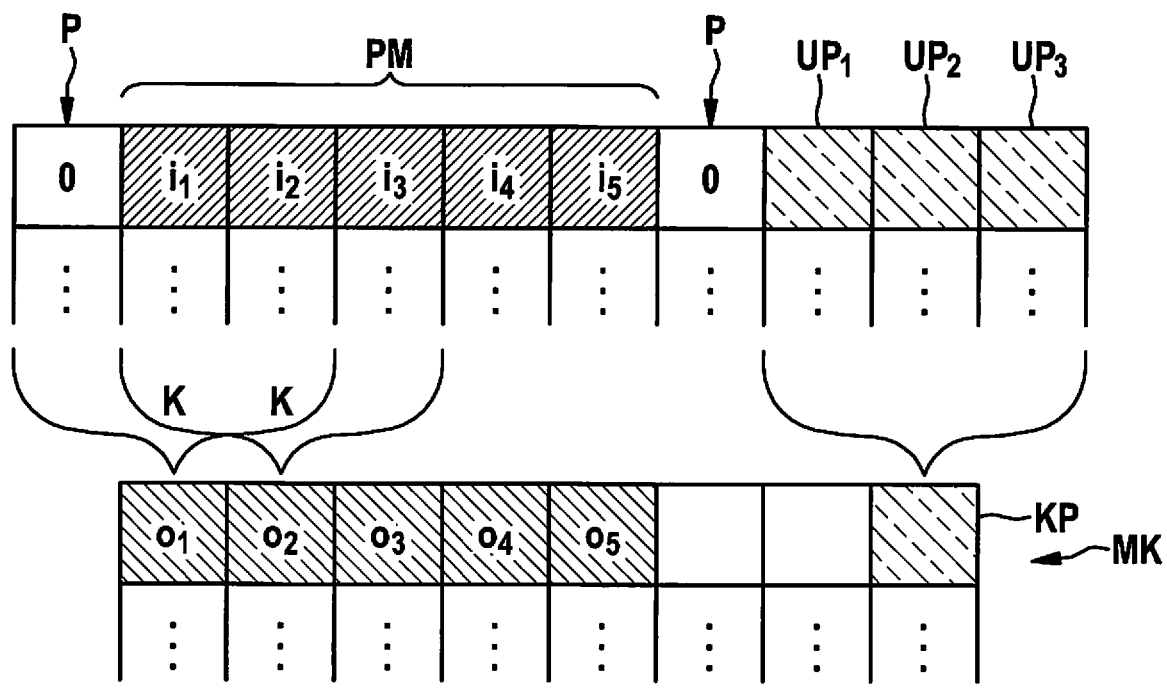
FIG. 3 shows a representation of the calculation paths of the comparison variables for a line of an input feature map.

This approach is illustrated in FIG. 3 for only one verification dimension and one single line/column of pixel matrix PM. In this case, kernel K includes the dimension D=3 and consistently processes adjoining input values i (at the edge areas, including a so-called padding P, in order to ensure for this exemplary embodiment that feature map MK has the same x-dimension and y-dimension as pixel matrix PM) to form a corresponding neuron value. Kernel K exhibits a constant parameterization per se (weightings and bias values) for the same pixel matrix PM and is moved across the entire pixel matrix for evaluating pixel groups of the dimension D=3, in order in each case to obtain a pixel value in feature map MK.

To verify the calculation of feature map MK, a number of verification pixels $UP_1 \ldots UP_D$, in addition to paddings P, is also added to the line and/or to the column (x-direction, y-direction) of pixel matrix PM, which corresponds to the dimension of kernel K in the corresponding matrix direction (x or y). Thus, when scanning pixel matrix PM, verification pixel UP in the exemplary embodiment shown is scanned last and from this a control pixel KP corresponding to the kernel function is determined. First control pixels KP1 may be situated at the beginning or at the end of a row or column of the matrix, may be assigned otherwise to the matrix or may also be provided embedded in the row or column.

In this way, the resulting feature map is provided with a first control pixel KP at the end of each row and/or of each column of the verification dimension as first comparison value V1, which result from the processing of verification pixel UP by assigned kernel K. In addition, the sum of the regular pixel values of resulting feature map MK may be included in the relevant row or the relevant column, in each case as second comparison value V2. For the example of a dimension of the kernel of three shown in FIG. 3, the following sums result for the three verification pixels $UP_1$, $UP_2$, $UP_3$ from pixel values $i_j$ of the lines of pixel matrix PM in question:

$$UP_1 = \sum_{j=1}^{4} i_j \quad UP_2 = \sum_{j=1}^{5} i_j \quad UP_3 = \sum_{j=2}^{5} i_j$$

$$o_1 = 0 \cdot k_1 + i_1 \cdot k_2 + i_2 \cdot k_3$$

$$o_2 = i_1 \cdot k_1 + i_2 \cdot k_2 + i_3 \cdot k_3$$

$$o_3 = i_2 \cdot k_1 + i_3 \cdot k_2 + i_4 \cdot k_3$$

$$o_4 = i_3 \cdot k_1 + i_4 \cdot k_2 + i_5 \cdot k_3$$

$$o_5 = i_4 \cdot k_1 + i_5 \cdot k_2 + 0 \cdot k_3$$

$$V1 = UP_1 \cdot k_1 + UP_2 \cdot k_2 + UP_3 \cdot k_3$$

$$V2 = \sum_{j=1}^{5} o_j \Rightarrow \sum_{j=1}^{5} o_j = \sum_{j=1}^{4} i_j \cdot k_1 + \sum_{j=1}^{5} i_j \cdot k_2 + \sum_{j=2}^{5} i_j \cdot k_3$$

Figure 4:
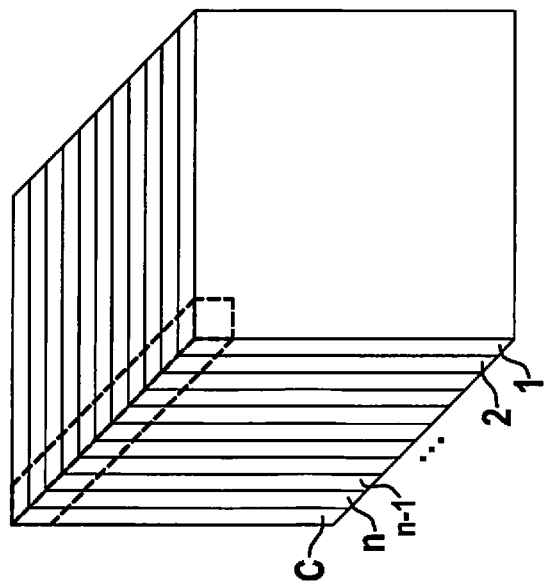
FIG. 4 shows the application of the neuron verification for an input feature map having multiple channels.
Figure 4:
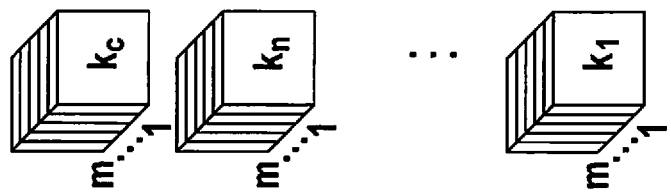
Figure 4:
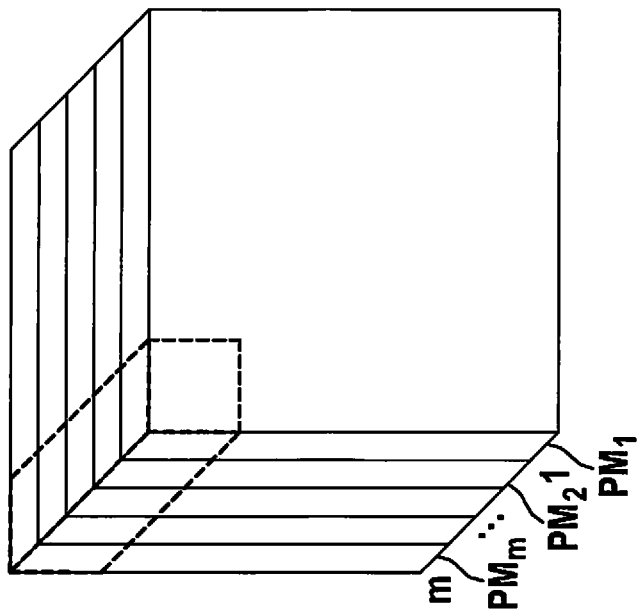

Normally, the pixel matrix and the feature map correspond to a p-dimensional tensor and may be considered as a set of pixels in p-dimensional space. For better illustration, a three-dimensional pixel matrix is assumed below. As illustrated in FIG. 4, such a three-dimensional pixel matrix is made up of multiple channels, for example, color channels RGB. Pixel matrix PM may then be considered as a set of pixels in a three-dimensional space. Pixels having a different x-coordinate and y-coordinate, but the same z-coordinate belong to one channel. In turn, each of the n kernels in this case generates a two-dimensional feature map and all n feature maps concatenated result in a three-dimensional feature map having n channels.

In the exemplary embodiment shown in FIG. 4, a pixel matrix having m channels is indicated. Also indicated are n kernels, each of which are made up of m·D² weightings and, if necessary, a bias value. The kernels have the same dimensions. A feature map having n channels is generated from these n kernels via the convolution of the pixels of the pixel matrix with kernel K, in each case assigned to the channel.

The pixel matrix having the n channels results in:

$$o_l(r, s) = \sum_{z=1}^{m}\sum_{x=1}^{3}\sum_{y=1}^{3} i(r+x-a, s+y-a, z) \cdot w_l(x, y, z)$$

i referring to a three-dimensional pixel matrix, i(x,y,z) referring to a pixel value of the three-dimensional pixel matrix, and $w_l(x,y,z)$ referring to the weightings of kernel $k_l$.

For the purpose of functional verification, the feature map may include one or multiple control channels, which include first comparison values $o_\Sigma(r,s)$ for each point r,s determined by the x-coordinate and the y-coordinate. These are calculated as a pixel-wise sum of the feature map $$o_\Sigma(r, s) = \sum_{l=1}^{n} o_l(r, s) = \sum_{l=1}^{n}\sum_{z=1}^{m}\sum_{x=1}^{3}\sum_{y=1}^{3} i(r+x-a, s+y-a, z) \cdot w_l(x, y, z)$$

a=(D+1)/2 and, therefore, corresponding to the relative position of the tile relative to the assigned query point x,y.

Also provided is a control kernel, which is ascertained by the weightings of the kernel as follows:

$$o_c(r, s) = \sum_{z=1}^{m}\sum_{x=1}^{3}\sum_{y=1}^{3} i(r+x-a, s+y-a, z) \cdot w_c(x, y, z)$$

with $$w_c(x, y, z) = \sum_{l=1}^{n} w_l(x, y, z), \forall\, x, y \in [1; 3], \forall\, z \in [1; m]$$

Thus, a control kernel is formed for creating the control channel, the weightings of the neurons of the control kernel corresponding to the sum of the weightings of the relevant neurons of the individual kernels for the channels of the pixel matrices.

Thus:

$$o_c(r, s) = \sum_{z=1}^{m}\sum_{x=1}^{3}\sum_{y=1}^{3} i(r+x-a, s+y-a, z) \cdot w_c(x, y, z) =$$

$$\sum_{z=1}^{m}\sum_{x=1}^{3}\sum_{y=1}^{3} i(r+x-a, s+y-a, z) \cdot \sum_{l=1}^{n} w_l(x, y, z) =$$

$$\sum_{l=1}^{n}\sum_{z=1}^{m}\sum_{x=1}^{3}\sum_{y=1}^{3} i(r+x-a, s+y-a, z) \cdot w_l(x, y, z)$$

The sum of all bias values of the kernels is added to the value $o_c(r,s)$ thus obtained as a control bias value.

The application of the control kernel to the pixel matrix results in a feature map having a control channel with two comparison values V2 ($o_c$). Second comparison values V2 are compared with first comparison values V1, in order to establish an error in the case of a disparity.

For the purpose of error recognition, the weightings and the bias value of the control kernel are calculated so that each corresponds to the sum of the n existing kernel weightings and bias values. This ensures that in an error-free case, the sum of the n channels of the output feature map must correspond to the control channel.

The method described above allows for the one-error-recognition. If the method is applied along the x-dimension or y-dimension of pixel matrix PM, the requisite redundancy corresponds to a dimension increase of the PM from (x,y,z) to (x+D,y,z) or (x,y+D,z). If the method is applied along the z-dimension, the requisite redundancy corresponds to a dimension increase of the PM of (x,y,z) to (x,y,z+1). Moreover, the number of the control pixels for the x-dimension and the y-dimension or the number of control channels for the z-dimension are freely selectable, as a result of which an error correction may also be enabled.

For the purpose of error correction, the erroneously calculated pixel value must be identified on the one hand, and the correct pixel value must be restored on the other hand. With suitably selected control kernels or control pixels, it is possible to identify the erroneous pixel value. Restoration of the correct pixel value is enabled by subtracting the correctly calculated pixel values from the erroneous control pixel. The number of the required control pixels for a one-error-correction is determined by:

$$\min_i \left( i + \left\lceil \frac{n}{i} \right\rceil \right)$$

n corresponding to the number of pixels in the dimension in question of the feature map without control pixels. This means that with i control pixels, it is possible to limit the erroneously calculated value to a set of n/i pixels. With $$\left\lceil \frac{n}{i} \right\rceil$$

additional control pixels, each of which compares the j value of the row, it is possible to identify the exact position of the erroneous pixel.

What is claimed is:

1. A method for verifying a calculation of a neuron value of multiple neurons of a neural network, the method comprising:
    performing or triggering a calculation of neuron functions of each of the multiple neurons, to obtain neuron values, the neuron functions being determined by individual weightings for each neuron input;
    calculating a first comparison value as a sum of the neuron values of the multiple neurons;
    performing or triggering a control calculation with one or multiple control neuron functions and with all neuron inputs of the multiple neurons, to obtain a second comparison value as a function of the neuron inputs of the multiple neurons and of a sum of the weightings of the multiple neurons assigned to the respective neuron input; and recognizing an error as a function of the first comparison value and of the second comparison value.

2. The method of claim 1, wherein the one or the multiple control neuron functions are performed by one or multiple additional provided control neurons.

3. The method of claim 1, wherein the neuron functions are each determined as a function of a bias value, the neuron values of the multiple neurons being calculated with the aid of the neuron functions as a function of the bias values, the control calculation of the second comparison value with the one or the multiple control neuron functions being performed as a function of a sum of all bias values of the multiple neuron functions.

4. The method of claim 1, wherein the multiple neurons are parts of multiple kernels for calculating a convolutional neural network based on a multi-dimensional data matrix having multiple channels, the control calculation being performed based on a control kernel, the weightings of the neuron functions of the control kernel being determined by a sum of the weightings of the multiple kernels assigned to a neuron input.

5. The method of claim 4, wherein the sum of all correlating data points within the multi-dimensional data matrix across all channels is formed as first comparison value, the second comparison value being ascertained by applying the control calculation with the control kernel for a matrix position of the respectively correlating data points.

6. The method of claim 1, wherein the multiple neurons are parts of a kernel for calculating a convolutional neural network based on a multi-dimensional data matrix, the control calculation being performed based on a number of sums of data values of the data matrix in a verification dimension, the second comparison value being determined as the sum of the products of the weightings of the kernel, in each case with one of the sums of the data values.

7. A verification system for verifying a calculation of neuron values of multiple neurons to be verified of a neural network, comprising:

a summing circuit for calculating a first comparison value as a sum of the neuron values of the multiple neurons, wherein the multiple neurons perform calculations of neuron functions for each of the multiple neurons, to obtain the neuron values, the neuron functions being determined by individual weightings for each neuron input, and wherein at least one control neuron, which is provided to perform a control calculation with one or multiple control neuron functions and with all neuron inputs of the multiple neurons, to obtain a second comparison value as a function of the neuron inputs of the multiple neurons and of a sum of the weightings of the multiple neurons assigned to the respective neuron input; and a comparison circuit to recognize an error as a function of the first comparison value and of the second comparison value.

8. A non-transitory computer readable medium having a computer program, which is executable by a processor, comprising:

a program code arrangement having program code for verifying a calculation of a neuron value of multiple neurons of a neural network, by performing the following:

performing or triggering a calculation of neuron functions of each of the multiple neurons, to obtain neuron values, the neuron functions being determined by individual weightings for each neuron input;

calculating a first comparison value as a sum of the neuron values of the multiple neurons;

performing or triggering a control calculation with one or multiple control neuron functions and with all neuron inputs of the multiple neurons, to obtain a second comparison value as a function of the neuron inputs of the multiple neurons and of a sum of the weightings of the multiple neurons assigned to the respective neuron input; and recognizing an error as a function of the first comparison value and of the second comparison value.

9. The computer readable medium of claim 8, wherein the one or the multiple control neuron functions are performed by one or multiple additional provided control neurons.

10. The computer readable medium of claim 8, wherein the neuron functions are each determined as a function of a bias value, the neuron values of the multiple neurons being calculated with the aid of the neuron functions as a function of the bias values, the control calculation of the second comparison value with the one or the multiple control neuron functions being performed as a function of a sum of all bias values of the multiple neuron functions.

11. The computer readable medium of claim 8, wherein the multiple neurons are parts of multiple kernels for calculating a convolutional neural network based on a multi-dimensional data matrix having multiple channels, the control calculation being performed based on a control kernel, the weightings of the neuron functions of the control kernel being determined by a sum of the weightings of the multiple kernels assigned to a neuron input.

12. The computer readable medium of claim 11, wherein the sum of all correlating data points within the multi-dimensional data matrix across all channels is formed as first comparison value, the second comparison value being ascertained by applying the control calculation with the control kernel for a matrix position of the respectively correlating data points.

13. The computer readable medium of claim 8, wherein the multiple neurons are parts of a kernel for calculating a convolutional neural network based on a multi-dimensional data matrix, the control calculation being performed based on a number of sums of data values of the data matrix in a verification dimension, the second comparison value being determined as the sum of the products of the weightings of the kernel, in each case with one of the sums of the data values.

* * * * *